US008270025B2

(12) United States Patent
Xu

(10) Patent No.: US 8,270,025 B2
(45) Date of Patent: Sep. 18, 2012

(54) IMAGE FORMING APPARATUS HAVING BLANK SHEET EJECTION PREVENTING FUNCTION AND BLANK SHEET EJECTION PREVENTING METHOD

(75) Inventor: Yangyi Xu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 423 days.

(21) Appl. No.: 12/320,194

(22) Filed: Jan. 21, 2009

(65) Prior Publication Data
US 2009/0190146 A1    Jul. 30, 2009

(30) Foreign Application Priority Data

Jan. 25, 2008    (JP) ................................. 2008-015477

(51) Int. Cl.
*G06F 15/00* (2006.01)
(52) U.S. Cl. ........................................ 358/1.6; 358/1.14
(58) Field of Classification Search .................... None
See application file for complete search history.

(56) References Cited

U.S. PATENT DOCUMENTS

| 6,336,705 B1 * | 1/2002 | Torigoe ........................... 347/43 |
| 7,309,117 B1 * | 12/2007 | Walton et al. ................... 347/15 |
| 2002/0122189 A1 * | 9/2002 | Salgado ........................... 358/1.6 |
| 2004/0041856 A1 * | 3/2004 | Im et al. ........................... 347/7 |
| 2004/0114158 A1 * | 6/2004 | Klassen et al. ................. 358/1.9 |
| 2008/0037059 A1 * | 2/2008 | Inoue ............................ 358/1.15 |

FOREIGN PATENT DOCUMENTS

| JP | 04-220366 | 8/1992 |
| JP | 11-123857 | 5/1999 |
| JP | 2000-201254 | 7/2000 |
| JP | 2002-120411 | 4/2002 |
| JP | 2007-141162 | 6/2007 |

OTHER PUBLICATIONS

Office Action dated Jun. 4, 2010 issued in corresponding Chinese Application No. 200910005433.5 and English translation thereof.
Office Action for corresponding Japanese Application No. 2008-015477 dated Jun. 12, 2012.

* cited by examiner

*Primary Examiner* — King Poon
*Assistant Examiner* — Helen Q Zong
(74) *Attorney, Agent, or Firm* — Harness, Dickey & Pierce

(57) ABSTRACT

An image forming apparatus for printing out one or more pages in an electronic file having color information in the form of at least one of character information and image information, includes an information acquiring unit configured to acquire at least one of the character information and the image information from the electronic file; and a blank page determining unit configured to determine whether a page in the electronic file is a blank page based on the color information of at least one of the character information and the image information acquired by the information acquiring unit. A page that is determined as being a blank page by the blank page determining unit is cancelled from being printed out.

14 Claims, 12 Drawing Sheets

IMAGE FORMING APPARATUS HAVING BLANK SHEET EJECTION PREVENTING FUNCTION AND BLANK SHEET EJECTION PREVENTING METHOD

BACKGROUND OF THE INVENTION

1. Field of the Invention

The present invention relates to an image forming apparatus having a blank sheet ejection preventing function and a blank sheet ejection preventing method.

2. Description of the Related Art

In recent years and continuing, digital color multi function peripherals (MFP) including functions such as a copying function, a facsimile (FAX) function, a printing function, a scanning function, and a function for delivering input images, are becoming indispensable at offices. An MFP is often provided with a device for automatically feeding originals referred to as an ADF (Auto Document Feeder), so that a plural number of originals can be scanned at once. The user can efficiently make copies of originals with this function.

Conventionally, when a blank original is included in the batch of originals, the blank original is printed out as a blank copy, which leads to a waste in transfer sheets. In an attempt to address this problem, patent document 1 discloses a determining unit for determining not to perform an image forming (printing) operation for a blank original. In the invention disclosed in patent document 1, image information is scanned from an original, and when it is determined that the original is a blank sheet, the image forming operation is cancelled or a warning is indicated to the user, so that transfer sheets are prevented from being wasted.

Patent Document 1: Japanese Laid-Open Patent Application No. 2000-201254

However, in recent years and continuing, there are cases where an electronic file of a material created at a user's terminal is directly sent to an MFP, and the electronic file is printed out with the MFP. However, the invention disclosed in patent document 1 is for optically scanning an original and determining whether the scanned original is a blank sheet. Therefore, if a blank file is printed out from the user's terminal via the network, a blank transfer sheet cannot be prevented from being output. In this case, transfer sheets are wasted.

SUMMARY OF THE INVENTION

The present invention provides an image forming apparatus having a blank sheet ejection preventing function and a blank sheet ejection preventing method in which one or more of the above-described disadvantages are eliminated.

A preferred embodiment of the present invention provides an image forming apparatus having a blank sheet ejection preventing function and a blank sheet ejection preventing method capable of preventing blank pages from being printed out when printing electronic files.

According to an aspect of the present invention, there is provided an image forming apparatus for printing out one or more pages in an electronic file having color information in the form of at least one of character information and image information, including an information acquiring unit configured to acquire at least one of the character information and the image information from the electronic file; and a blank page determining unit configured to determine-whether a page in the electronic file is a blank page based on the color information of at least one of the character information and the image information acquired by the information acquiring unit, wherein a page that is determined as being a blank page by the blank page determining unit is cancelled from being printed out.

According to an aspect of the present invention, there is provided a blank sheet ejection preventing method performed in an image forming apparatus for printing out one or more pages in an electronic file having color information, the blank sheet ejection preventing method including an information acquiring step of acquiring at least one of character information and image information from the electronic file; and a blank page determining step of determining whether a page in the electronic file is a blank page based on the color information of at least one of the character information and the image information acquired at the information acquiring step, wherein the page that is determined as being the blank page at the blank page determining step is cancelled from being printed out.

According to one embodiment of the present invention, an image forming apparatus having a blank sheet ejection preventing function and a blank sheet ejection preventing method are provided, which are capable of preventing blank pages from being printed out when printing electronic files.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

(Overview and Configuration of Image Forming Apparatus)

Figure 1:
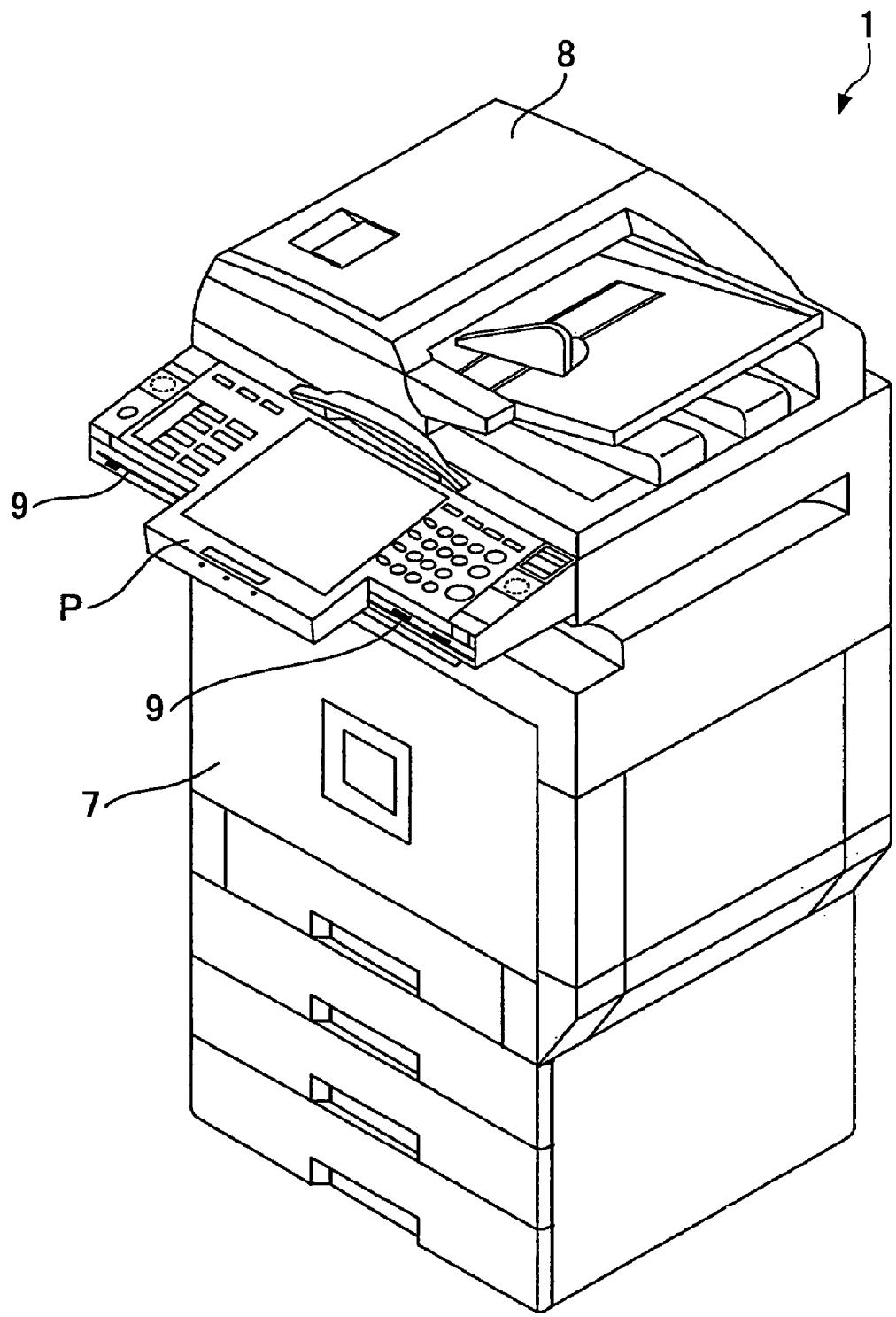
FIG. 1 is an external perspective view of an image forming apparatus according to an embodiment of the present invention.

First, before specifically describing the present invention, a description is given of an image forming apparatus according to an embodiment of the present invention with reference to FIG. 1. FIG. 1 is an external perspective view of an image forming apparatus 1. The image forming apparatus 1 is a digital color multi function peripheral (MFP) including functions such as a copying function, a facsimile (FAX) function, a printing function, a scanning function, and a function for delivering input images.

The image forming apparatus 1 has an image scanning device 8 disposed on top of a printing device 7. The printing device 7 is an image forming unit for forming an image onto a medium such as a transfer sheet. The image scanning device 8 is an image scanning unit for scanning an image from an original. On the outer surface of the image scanning device 8, there is provided an operation panel P which displays information to the operator and receives various inputs such as function settings from the operator. Furthermore, beneath the operation panel P, there is provided an external media input/output device 9 which is used for writing program codes and image data into a storage medium M.

Figure 2:
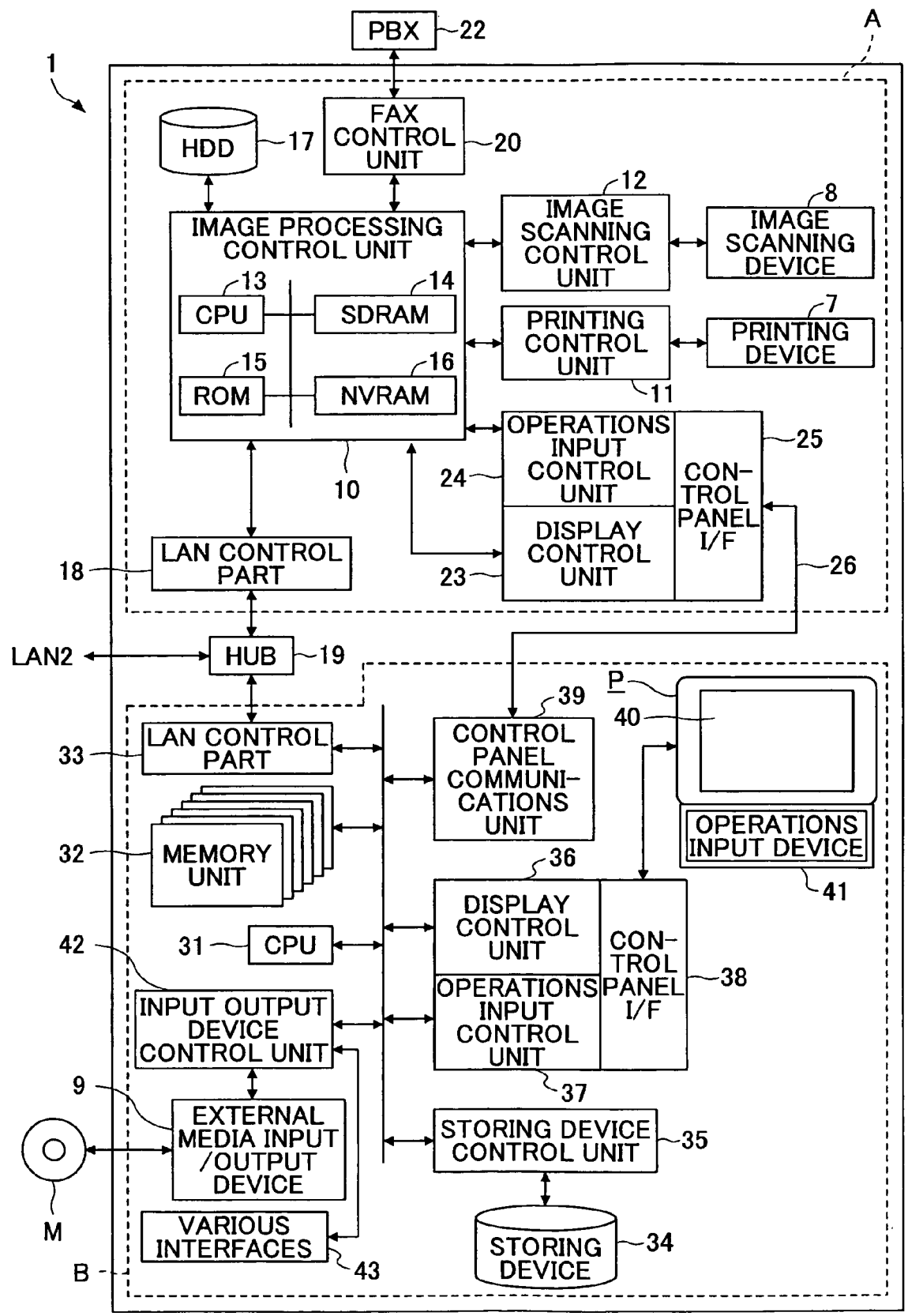
FIG. 2 is a block diagram of a hardware configuration of the image forming apparatus according to an embodiment of the present invention.

FIG. 2 is a block diagram of the image forming apparatus 1. The image forming apparatus 1 is broadly divided into an image processing unit section A and an information processing unit section B. A printing device 7 and an image scanning device 8 belong to the image processing unit section A. The operation panel P and the external media input/output device 9 belong to the information processing unit section B.

First, the image processing unit section A is described. The image processing unit section A having the printing device 7 and the image scanning device 8 includes an image processing control unit 10. The image processing control unit 10 implements control of the imaging process at the image processing unit section A. A printing control unit 11 and an image scanning control unit 12 are connected to the image processing control unit 10. The printing control unit 11 controls the printing device 7. The image scanning control unit 12 controls the image scanning device 8. The printing control unit 11 outputs a printing instruction including the image data to the printing device 7 following the control of the image processing control unit 10. The printing control unit 11 causes the printing device 7 to form an image on a transfer sheet and output the transfer sheet. The image scanning control unit 12 drives the image scanning device 8 under the control of the image processing control unit 10. As an example, the image scanning control unit 12 condenses reflection light, which has been radiated from a lamp to the surface of an original, onto a light receiving element (for example, CCD (Charge Coupled Device)) by a mirror or a lens so as to scan the original, and performs A/D conversion so as to generate digital image data of 8 bits in the respective colors of RGB.

The image processing control unit 10 has a microcomputer structure in which the following elements are connected by a bus: a CPU (Central Processing Unit) 13 being a main processor; a memory device 14 (e.g., an SDRAM (Synchronous Dynamic Random Access Memory)) for temporarily holding the image data generated by the image scanning device 8 so as to be used for image creation by the printing device 7; a ROM (Read Only Memory) 15 for storing control programs; and an NVRAM (Non Volatile RAM) 16 for storing a system log/a system setting/log information, for example, which is capable of holding data even when the power is turned off.

An HDD (hard disk drive) 17, a LAN control part 18, and a FAX control unit 20 are connected to the image processing control unit 10. The HDD 17 is a storing device for storing a large amount of image data and job history, for example. The LAN control part 18 connects the image processing unit section A to a LAN 2 via a HUB 19 that is a line concentrator provided inside of the image forming apparatus. The FAX control unit 20 implements facsimile control. The FAX control unit 20 is connected to a PBX (Private Branch exchange) 22, so that the image forming apparatus 1 can make contact with a remote facsimile machine.

A display control unit 23 and an operations input control unit 24 are connected to the image processing control unit 10. The display control unit 23 outputs an image display control signal to a control panel communications unit 39 of the information processing unit section B via a communication cable 26 connected to a control panel I/F (interface) 25 by control of the image processing control unit 10. The display control unit 23 implements control of the image display of the operation panel P of the information processing unit section B. The operations input control unit 24 inputs an input control signal to the control panel communications unit 39 via the communication cable 26 connected to the control panel I/F 25 by the control of the image processing control unit 10. The input control signal corresponds to functional settings or input operations, for example, input by the operator from the operation panel P of the information processing unit section B. That is, the image processing unit section A monitors the operation panel P of the information processing unit section B via the communication cable 26. In this way, the image processing unit section A connects the communication cable 26 to an image processing unit, which is described in greater detail below and which may be included in an image processing device, so as to use the operation panel P of the information processing unit section B. In other words, the display control unit 23 and the operations input control unit 24 of the image processing unit section A operate in electrical communication with the operation panel P. With such a structure, the image processing unit section A analyzes printing data that is image information and a command instructing a printing operation from outside (such as a server computer, a client computer, or a facsimile machine), so as to convert the printing data into bit-map data to be printed as the output image data. The image processing unit section A analyzes the printing mode from the command and determines the operation. The image processing unit section A receives the printing data and the command from the LAN control part 18 or the FAX control unit 20 and operates accordingly. In addition, the image processing unit section A can transfer, to the outside, the printing data, original scanning data, output image data made by processing such data for output, and/or compressed data made by compressing such data.

Next, the information processing unit section B having the operation panel P is discussed. The information processing unit section B is controlled by a generic OS (Operating System) used for an information processing device generally referred to as a personal computer. The information processing unit section B includes a CPU 31 as a main processor. A memory unit 32 and a storing device control unit 35 are connected by a bus to the CPU 31. The memory unit 32 includes a RAM that is a work area of the CPU 31 and a ROM that is exclusively a reading memory where a startup program is stored. The storing device control unit 35 controls input and output of the data to and from a storing device 34 such as an HDD storing the OS (Operation System) or application programs.

A LAN control part 33 is connected to the CPU 31. The LAN control part 33 is a communication interface for connecting the information processing unit section B to the LAN 2 via the HUB 19. An IP address that is a network address allocated to the LAN control part 33 is different from the IP address allocated to the LAN control part 18 of the image processing unit section A. In other words, two IP addresses are allocated to the image forming apparatus 1 according to an embodiment of the present invention. The image processing unit section A and the information processing unit section B are respectively connected to the LAN 2. Therefore, data can be exchanged between the image processing unit section A and the information processing unit section B.

In addition, a display control unit 36 and an operations input control unit 37 for controlling the operation panel P via a control panel I/F 38 are connected to the CPU 31. A display device 40 and an operations input device 41 are included in the operation panel P. Accordingly, the operation panel P can be, for example, a touch panel. An input output device control unit 42 controls the external media input/output device 9 which reads the storage medium M and other media, and the input to and output from various interfaces 43.

(Functions of Image Forming Apparatus)

Figure 3:
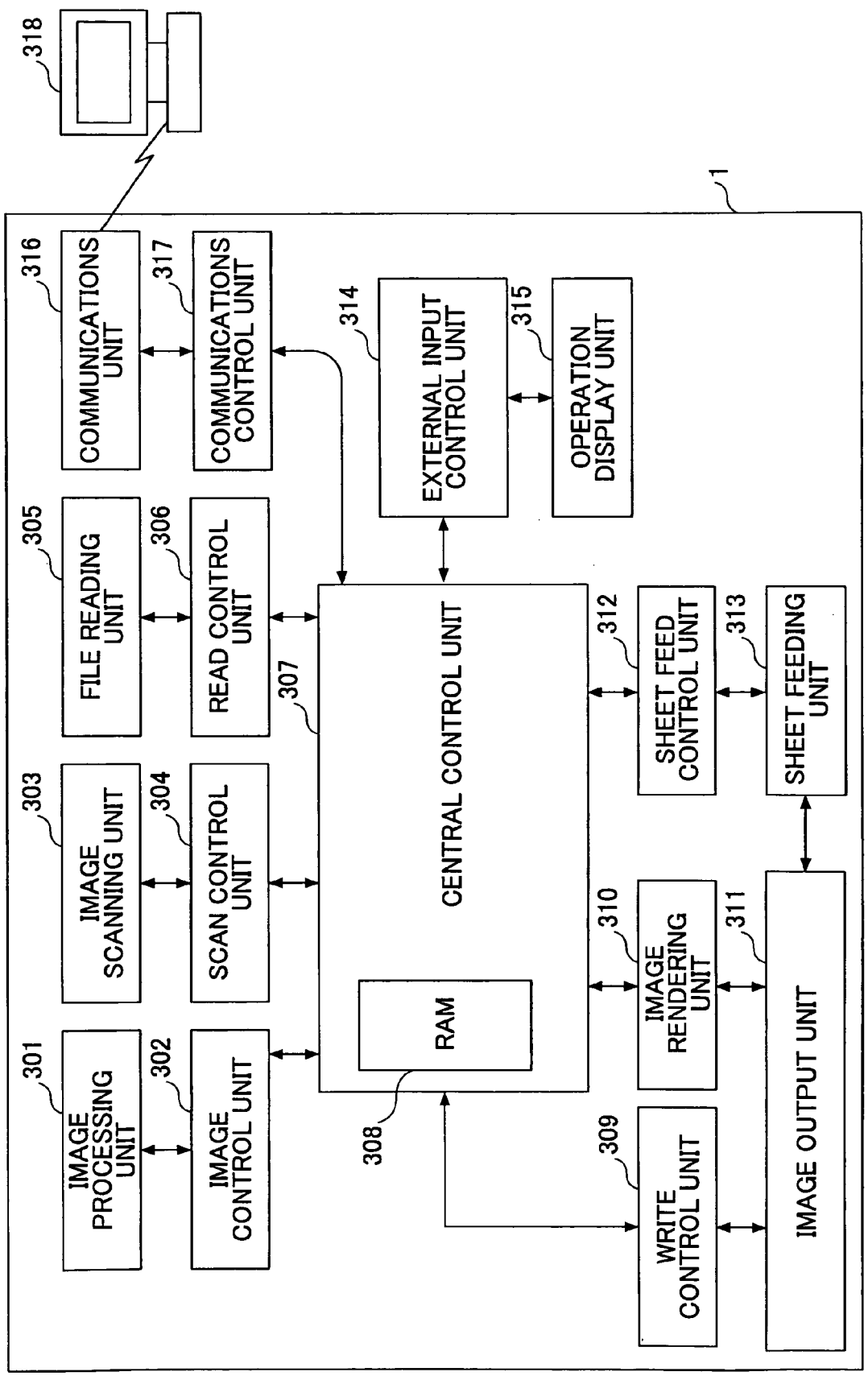
FIG. 3 is a functional block diagram of the image forming apparatus according to an embodiment of the present invention.

FIG. 3 is a functional block diagram of control units and corresponding units included in the image forming apparatus 1 according to an embodiment of the present invention.

The image forming apparatus 1 includes an image processing unit 301, an image control unit 302, an image scanning unit 303, a scan control unit 304, a file reading unit 305, a read control unit 306, a central control unit 307, a RAM 308, a write control unit 309, an image rendering unit 310, an image output unit 311, a sheet feed control unit 312, a sheet feeding unit 313, an external input control unit 314, an operation display unit 315, a communications unit 316, and a communications control unit 317.

The image control unit 302 controls the image processing unit 301. The image processing unit 301 makes a determination as to whether a page is blank (blank page determination) based on various image processes and electronic files. Details are given below. The image processing unit 301 corresponds to an information acquiring unit and a blank page determining unit.

The scan control unit 304 controls the image scanning unit 303, and includes a scanner control circuit, an exposure lamp control circuit, and a timing control circuit. Furthermore, the scan control unit 304 also controls a scanner driving motor for driving a scanner, a platen open/close detection sensor, and an original size detection sensor.

The read control unit 306 controls the file reading unit 305. The file reading unit 305 corresponds to the external media input/output device 9, and reads an electronic file from an external media. The communications control unit 317 controls the communications unit 316. The communications unit 316 receives electronic files from an external terminal 318 via a network.

The central control unit 307 includes the RAM 308, the CPU 13, the ROM 15, and other input/output circuits, and controls communications between the various control units. The RAM 308 temporarily holds various information items to be processed by the image processing unit 301.

The image output unit 311 outputs images that have been formed. The write control unit 309 writes information into the image output unit 311 and the image rendering unit 310 controls rendering of images. The write control unit 309 controls oscillation of the semiconductor laser, and controls a polygon motor based on signals detected by a synchronous detection input light unit. The image rendering unit 310 generates image data for printing (print image data) from image data that has been processed by the image processing unit 301. The generated print image data is stored in the RAM 308 and is output from the image output unit 311. The sheet feed control unit 312 switches the sheet feeding cassette to be used and controls the sheet feeding unit 313 including a motor, a clutch, and a solenoid for feeding sheets, and also controls the resist roller so that the transfer sheet is sent out to a position corresponding to where an image is formed on the photoconductive drum. The sheet feed control unit 312 is connected to the central control unit 307 and implements the above control operations while informing the central control unit 307 of the status of the sheet feeding unit 313. At the operation display unit 315, various information items are input, such as setting ON/OFF the blank sheet ejection preventing function. The external input control unit 314 controls the operation display unit 315. The operation display unit 315 includes operation input keys, a liquid crystal display screen, and an LED. The external input control unit 314 is connected to the central control unit 307 and sends, to the central control unit 307, the various information items input at the operation display unit 315.

The image processing unit 301 performs the blank page determination on the electronic file that has been read, and when the electronic file (or a page in the electronic file) is determined as being a blank page, the corresponding electronic file (or page in the electronic file) is not printed onto a print medium and a blank sheet is not printed out, i.e., not ejected. A detailed description on this blank page determination is given below.

(Blank Page Determination Process)

Figure 4:
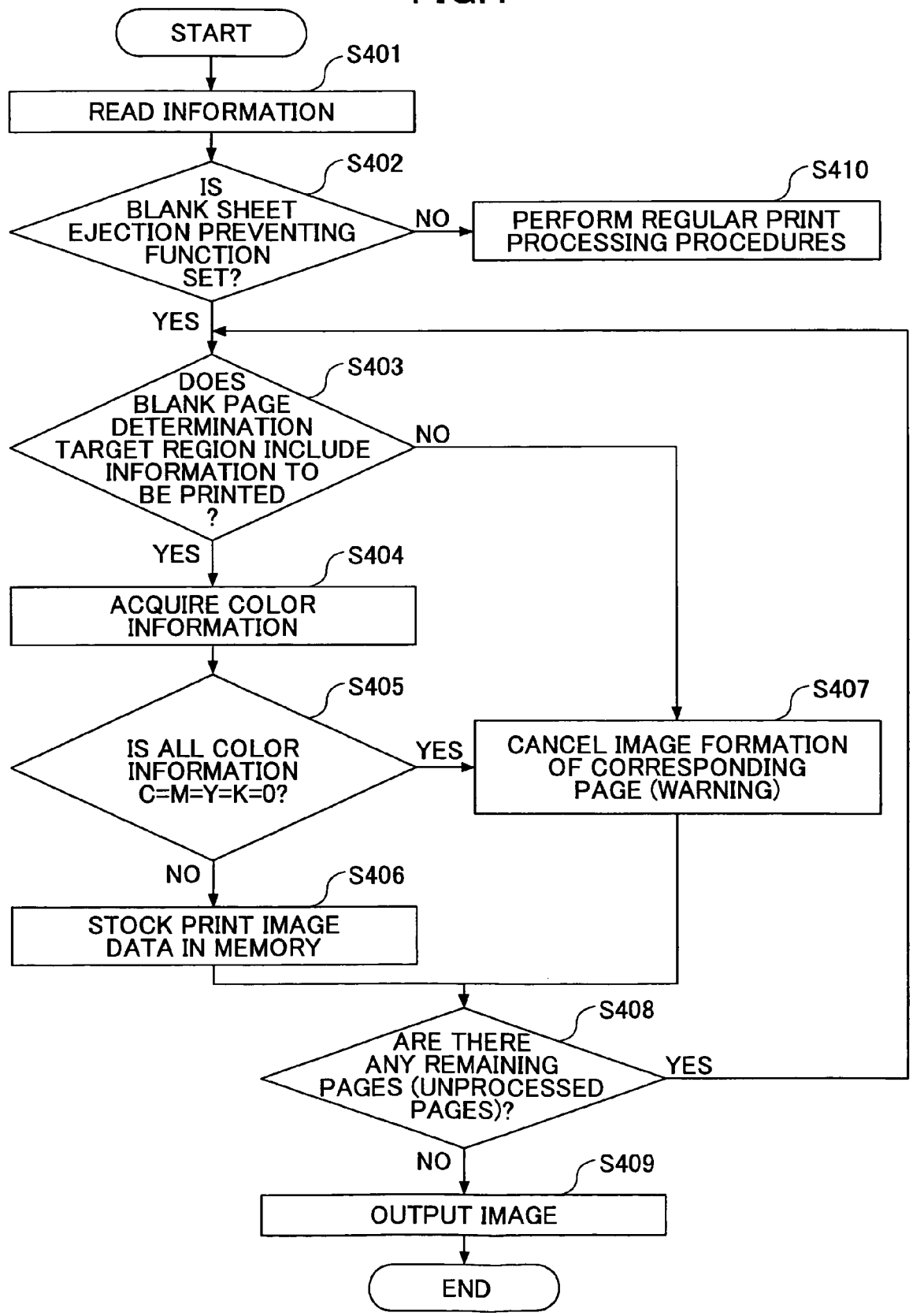
FIG. 4 is a flowchart of a blank page determination process.

A description is given of the blank page determination process according to an embodiment of the present invention with reference to the flowchart shown in FIG. 4. In step S401, the image processing unit 301 acquires, from an electronic file, the information necessary for printing the electronic file, such as character information and image information. This is performed by the information acquiring unit. The character information may also include blank characters (spaces) and line feed characters used for starting new lines.

In step S402, when it is determined that a blank sheet ejection preventing function is set, the flow proceeds to step S403. When the blank sheet ejection preventing function is not set, the flow proceeds to step S410, and the electronic file is printed out by regular print processing procedures.

In step S403, it is confirmed as to whether a region that is a target of blank page determination (blank page determination target region) includes information to be printed out. When the electronic file includes plural pages, this confirmation process is performed for one page at a time. For example, if the electronic file includes ten pages, first, the confirmation process is performed only for the first page. When a determination as to whether the first page is a blank page has been made, step S403 is repeated for the second page to confirm whether the second page includes information to be printed out. Those skilled in the art will appreciate that it is possible to perform the confirmation process for all ten pages at once; however, as a matter of convenience in the description of the present embodiment, one page is processed at a time. If the electronic file only includes one page, the confirmation process for the entire electronic file ends when the confirmation process for one page has ended.

The blank page determination target region is defined as follows. That is, a certain range in a page is specified, and the blank page determination is performed for the specified range. This specified range corresponds to the blank page determination target region. Usually, unless instructed otherwise, the blank page determination target region corresponds to a rendering region (a region used for rendering objects). It is also possible to make settings such that the blank page determination target region is a region lying between the header and the footer of the page, or a region lying between the top five lines and the bottom five lines, or a region extending from a certain page to another page in the electronic file. The blank page determination process can be efficiently performed by limiting the blank page determination target region only to a desirable range.

In step S403, when it is determined that there is information (character information, image information) to be printed included in the blank page determination target region, the flow proceeds to step S404. When there is no information to be printed, it means that the corresponding page is a blank page without any information to be printed, and therefore the flow proceeds to step S407, where the image forming process for this page is canceled. Next, in step S408, when there are remaining pages in the electronic file (unprocessed pages), the flow returns to step S403, and the next page is processed.

In step S404, the image processing unit 301 acquires color information of character information and image information from the information read at step S401. When the character information includes blank characters and line feed characters, these are acquired as well. The color information is represented by values of C (cyan), M (magenta), Y (yellow), and K (black).

In step S405, the image processing unit 301 determines whether all of the color information items (values of C, M, Y, and K) of the character information and the image information in the page are zero. When all of the color information items (values of C, M, Y, and K) of the character information and the image information are zero (C=M=Y=K=0), it is determined that the page is a blank page. This is determined by the blank page determining unit. When the page is determined to be a blank page, the flow proceeds to step S407. The processes at and beyond step S407 are as described above. The blank characters and line feed characters are regarded as having color information determined as being C=M=Y=K=0. Thus, when a page includes blank characters and line feed characters but the blank page determination is not performed, such a page is consequently printed out. However, by treating blank characters and line feed characters as described above, such a page can be determined as being a blank page, and a blank sheet can be prevented from being printed out, i.e., ejected.

Figure 5:
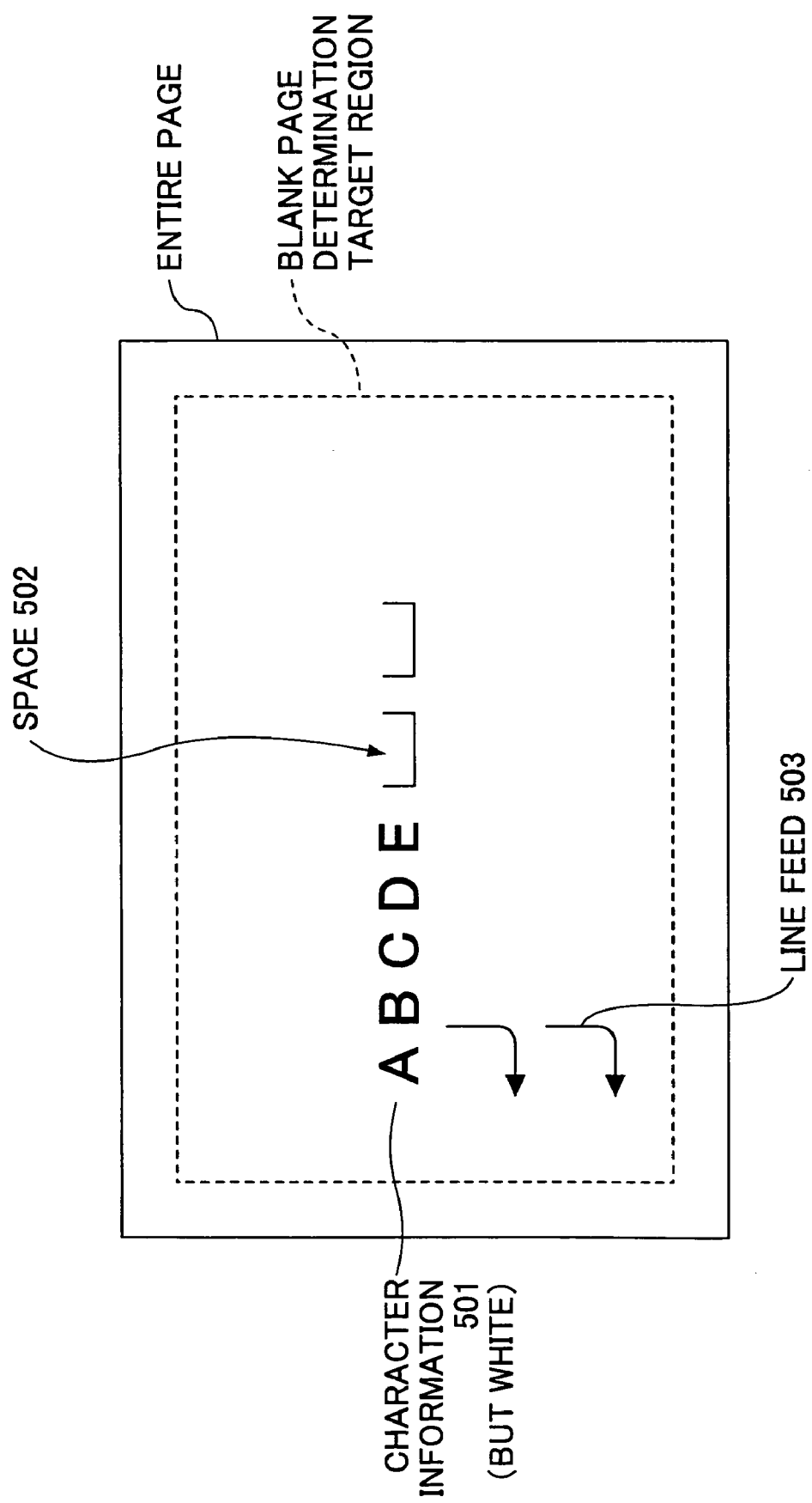
FIG. 5 illustrates an example of a blank page.
Figure 6:
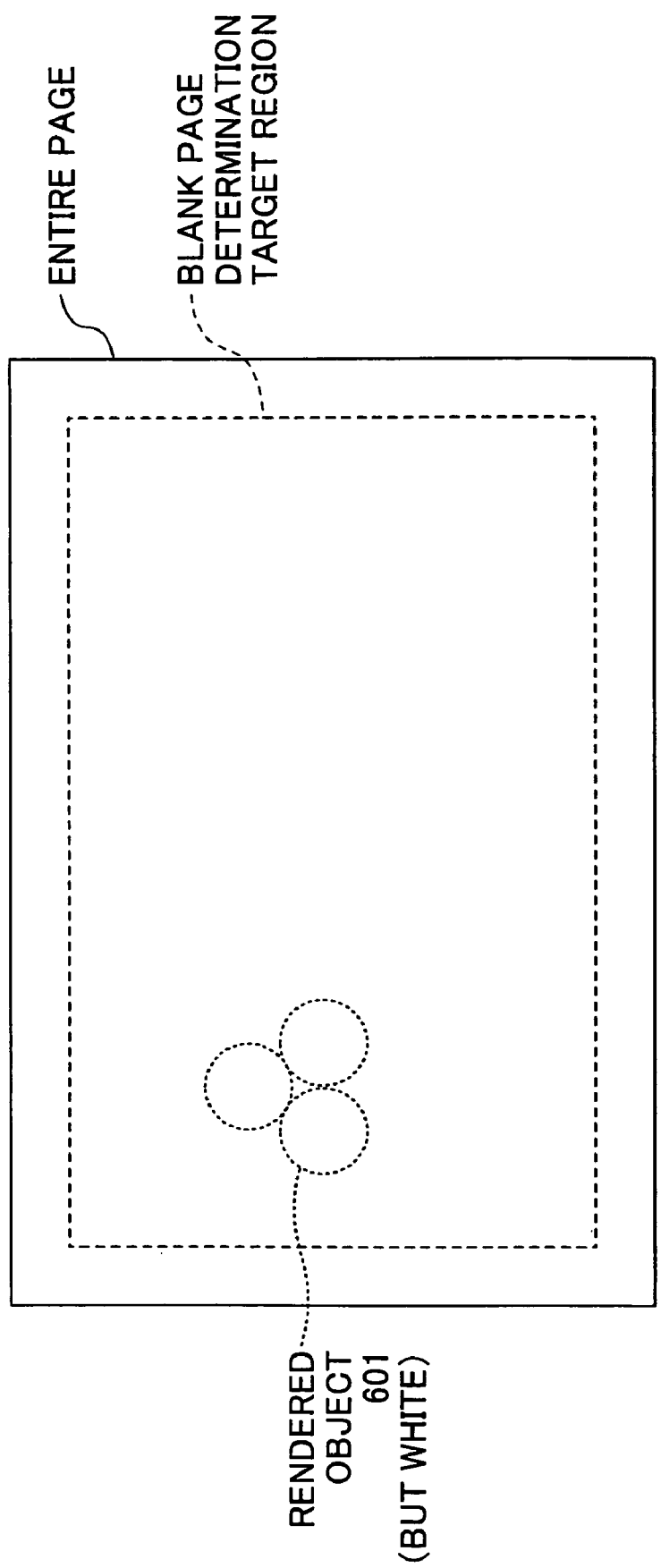
FIG. 6 illustrates an example of a blank page.

Step S405 is further described with reference to FIGS. 5 and 6. FIGS. 5 and 6 illustrate examples of pages in which all color information items correspond to C=M=Y=K=0. The page example in FIG. 5 includes "ABCDE" as character information 501. However, these characters are white. Accordingly, the color information of this character information "ABCDE" is C=M=Y=K=0. Furthermore, this page includes spaces 502 and line feeds 503. If the portions corresponding to the spaces 502 and the line feeds 503 were printed, the printed sheet would correspond to a blank sheet. Blank characters (corresponding to the spaces 502) and line feed characters (corresponding to the line feeds 503) are regarded as having color information determined as being C=M=Y=K=0. Thus, the example page of FIG. 5 is determined to be a blank page and is not printed out (i.e., not ejected). In a practical situation, the page of FIG. 5 appears to be a blank page from which nothing can be visually perceived. Thus, even if this page were printed, it would be printed out (i.e., ejected) as a blank page.

The page example of FIG. 6 includes a rendered object 601. However, the color of this rendered object 601 is white (C=M=Y=K=0). Therefore this page is determined as being a blank page, and is not printed out. In this manner, when a page in the electronic file includes information to be printed, but this page would appear to be a blank page if it were printed out, this page is treated as a page without any information to be printed. That is, this page does not undergo an image forming process.

In step S405, when C=M=Y=K=0 does not apply, the flow proceeds to step S406. An example of a case where C=M=Y=K=0 does not apply is when the color information of the character information 501 "ABCDE" in FIG. 5 has a particular color (other than white). If "ABCDE" has a particular color in the page with spaces and line feed characters, "ABCDE" would be visible (visually perceivable) with some degree of density when this page is printed out. Accordingly, this page is supposed to be printed out.

In step S406, the image processing unit 301 generates print image data for the page to be printed out, and stores this print image data in a memory. Next, in step S408, it is checked whether all of the pages have been processed. When there are remaining pages, the flow returns to step S403. When there are no pages remaining, at step S409, the print image data stored in the memory is printed out. The pages that have been determined as being blank pages are not stored in the memory, and are thus not printed out.

Figure 7:
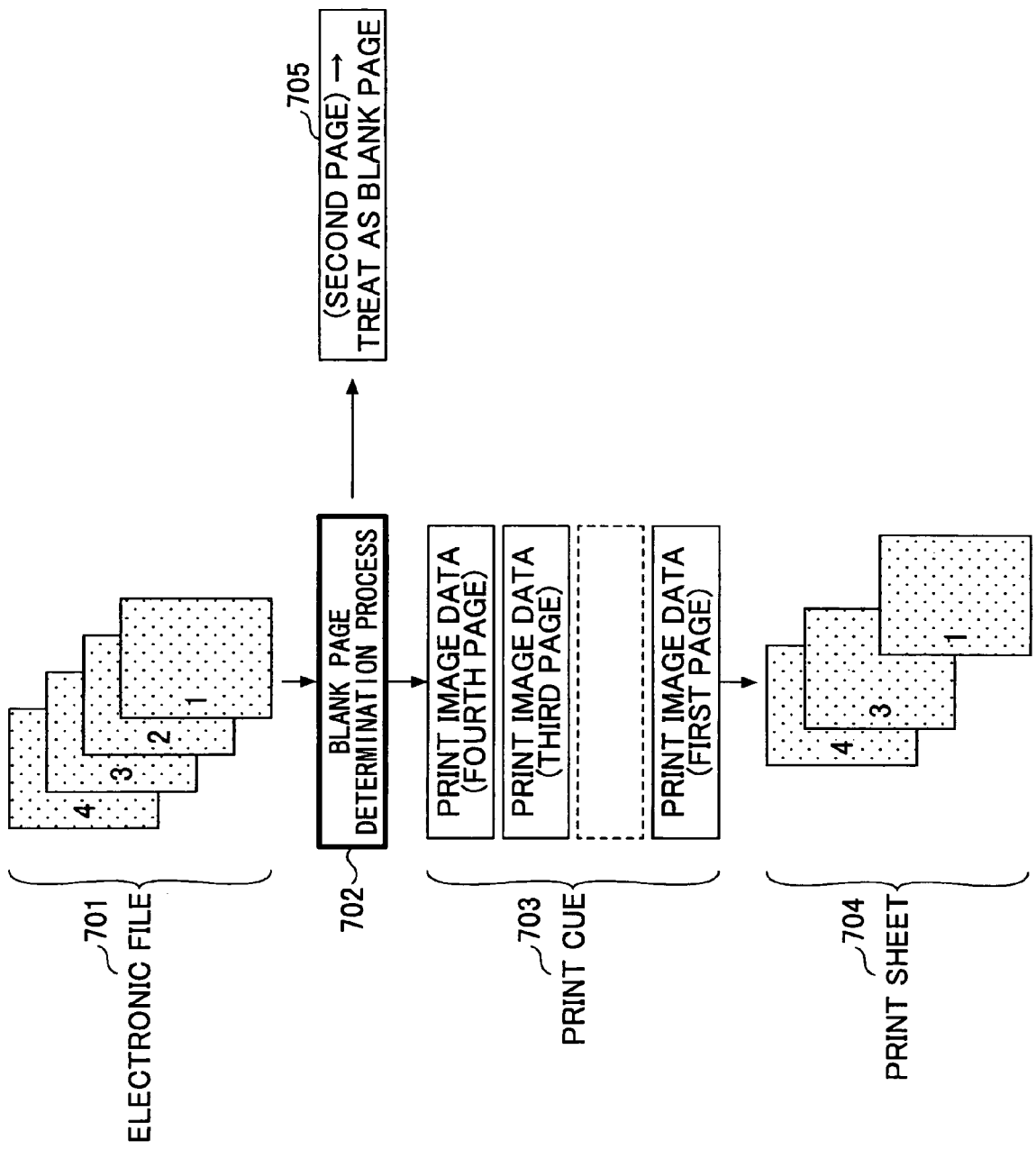
FIG. 7 illustrates an example of the blank page determination process.

FIG. 7 illustrates an example of the above described processes. An electronic file 701 including four pages is input. A blank page determination process 702 is performed to determine whether there are blank pages. Print image data is not formed for a second page 705 that has been determined as being a blank page (cancel image formation). Meanwhile, print image data is formed for the first, third, and fourth pages that have been determined as not being blank pages, and the print image data is stored in a print cue 703. When all four pages have undergone the blank page determination process, the print image data stored in the print cue 703 is printed out via print sheets 704.

The blank page determination process is described as above. At step S407, it is described that "the image forming process for this page is canceled". However, instead of this, a warning can be displayed on a screen of the communications unit 316, for example. Furthermore, a warning which allows the operator to make selections can be displayed such as "there is a blank page, would you like to cancel the printing for this page?" When "do not cancel" is selected at this step, the flow proceeds from step S407 to step S406.

The color of an image photographed by a digital camera or an image displayed on a display screen of a PC is in an RGB format expressing colors with the use of light emission (additive color mixture method). However, the paint used in the image forming apparatus cannot express all colors in the RGB format, and therefore the colors are converted into the CMYK format for printing them out. Colors in formats other than the RGB format or the CMYK format are printed out by the image forming apparatus as color information of the CMYK format. In order to make an embodiment of the present invention applicable regardless of the format in which the input colors are expressed, in the present embodiment, the color information which is a target of blank page determination is defined by CMYK. For example, when the color expression format of an input file is the RGB format, the blank page determination can be performed with the use of RGB values, without converting the file into a CMYK format. In this case, the page is determined as being a blank sheet when the color information is $R=G=B=255(2^8-1)$, where each of RGB is expressed by 8 bits. Where each of RGB is expressed by 16 bits, with a total of 48 bits, the page is determined as being a blank sheet when the color information is $R=G=B=(2^{16}-1)$, which is a value expressing white.

With the above configuration, if an electronic file (page) would appear to be a blank sheet if printed out, this electronic file (page) can be prevented from being printed out. Thus, print sheets can be prevented from being wasted.

EXAMPLE 1

Next, a description is given of a blank page determination process in a case where an electronic file is set to have a color space of a single color (printing color), but this electronic file includes color information other than that particular single color. This case is described in detail with reference to FIG. 8.

Figure 8:
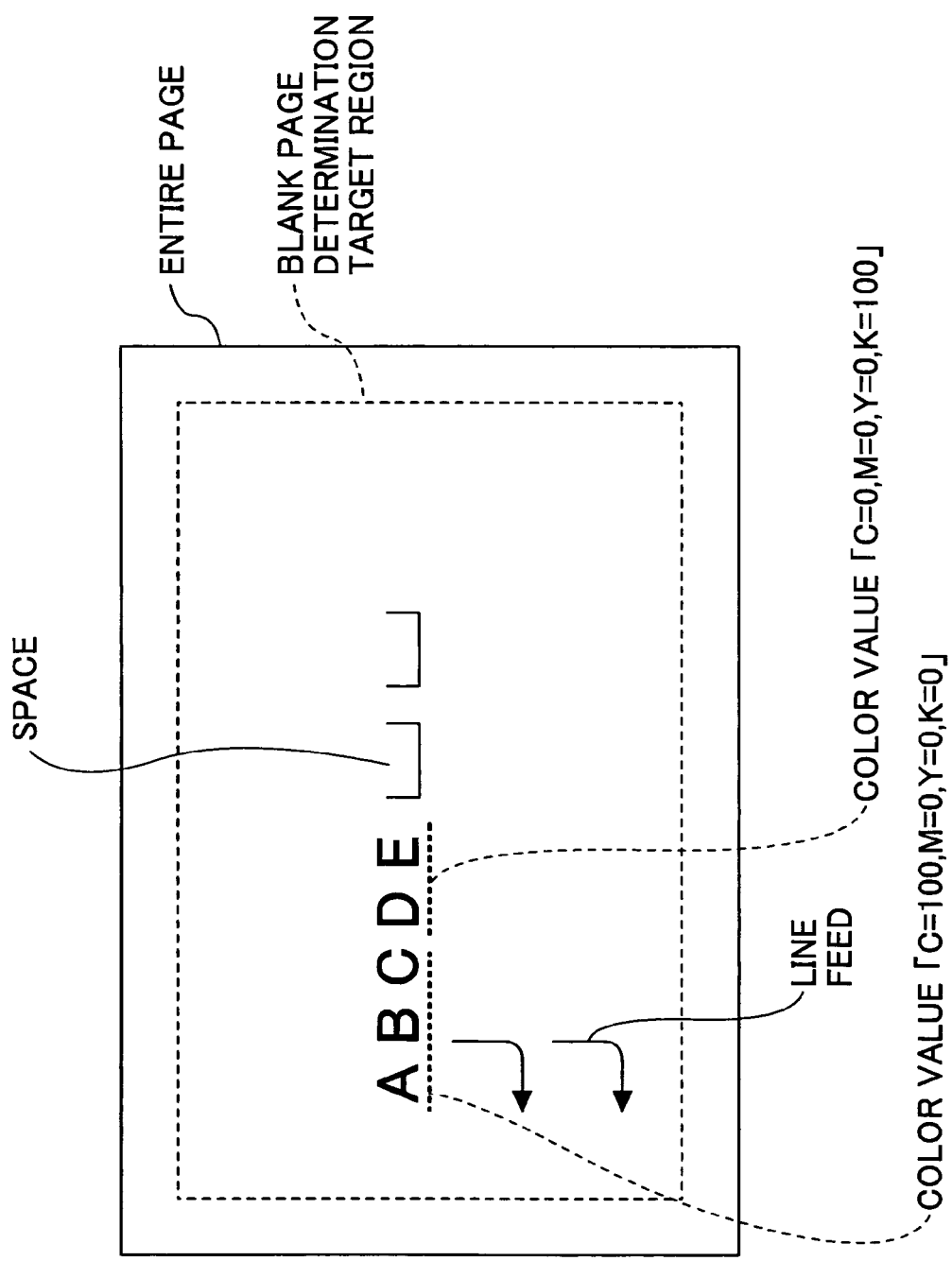
FIG. 8 illustrates an example of a blank page having a color space of a single color.
Figure 9:
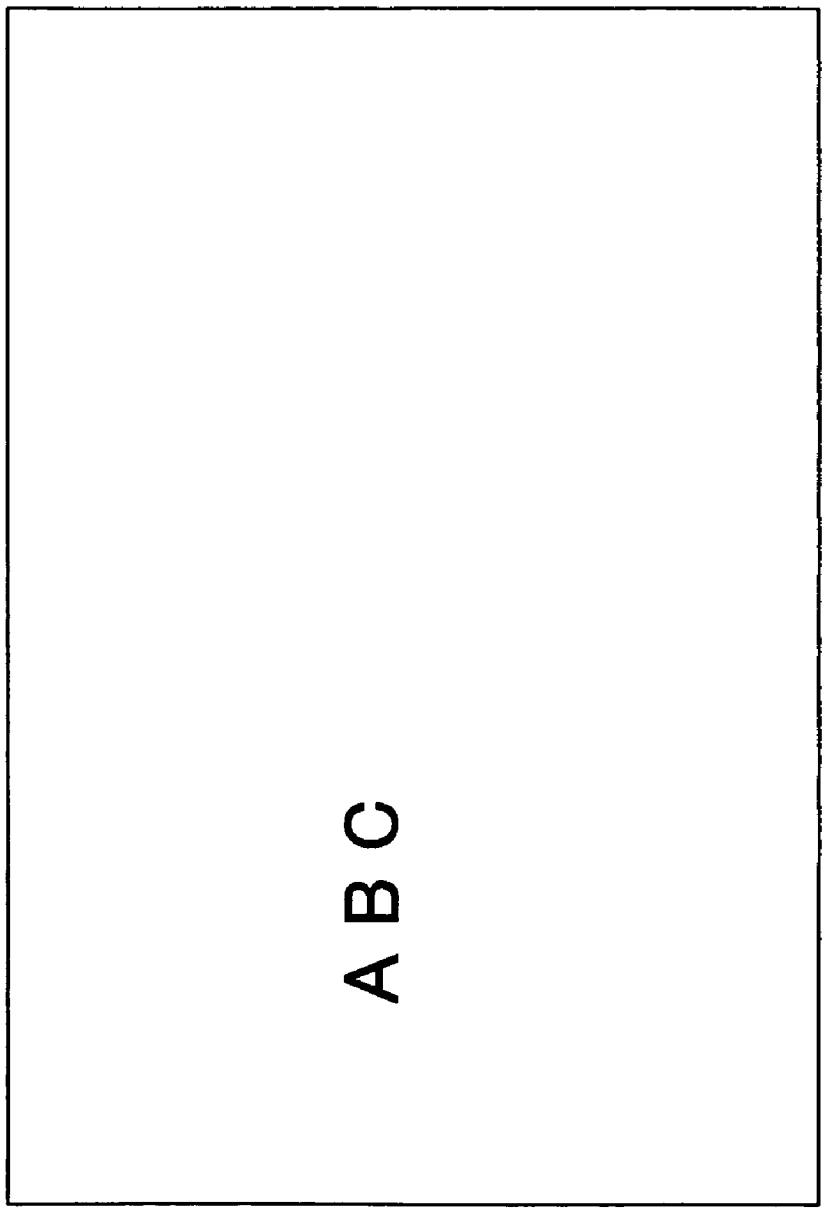
FIG. 9 illustrates an example of a blank page having a color space of a single color which has been printed out.

In the page shown in FIG. 8, the color of the character information "ABCDE" is different from that of the page shown in FIG. 5. The letters "ABC" are cyan (C=100, M=0, Y=0, K=0) and the letters "DE" are black (C=0, M=0, Y=0, K=100). If this page were color-printed by a regular setup (i.e., not with a color space of only a single color), the page would be printed out as it appears in FIG. 8, with the colors as indicated by the values. However, it is assumed that the color space of this page is set to be a single color of cyan when color-printing this page (printing color). When this page is color-printed with this setup, the page is printed out as shown in FIG. 9. The letters "ABC" are obviously printed out in cyan. The color space of this page only uses cyan, and therefore "DE" which are black letters, while printed, do not have any color and are thus not visible.

Figure 10:
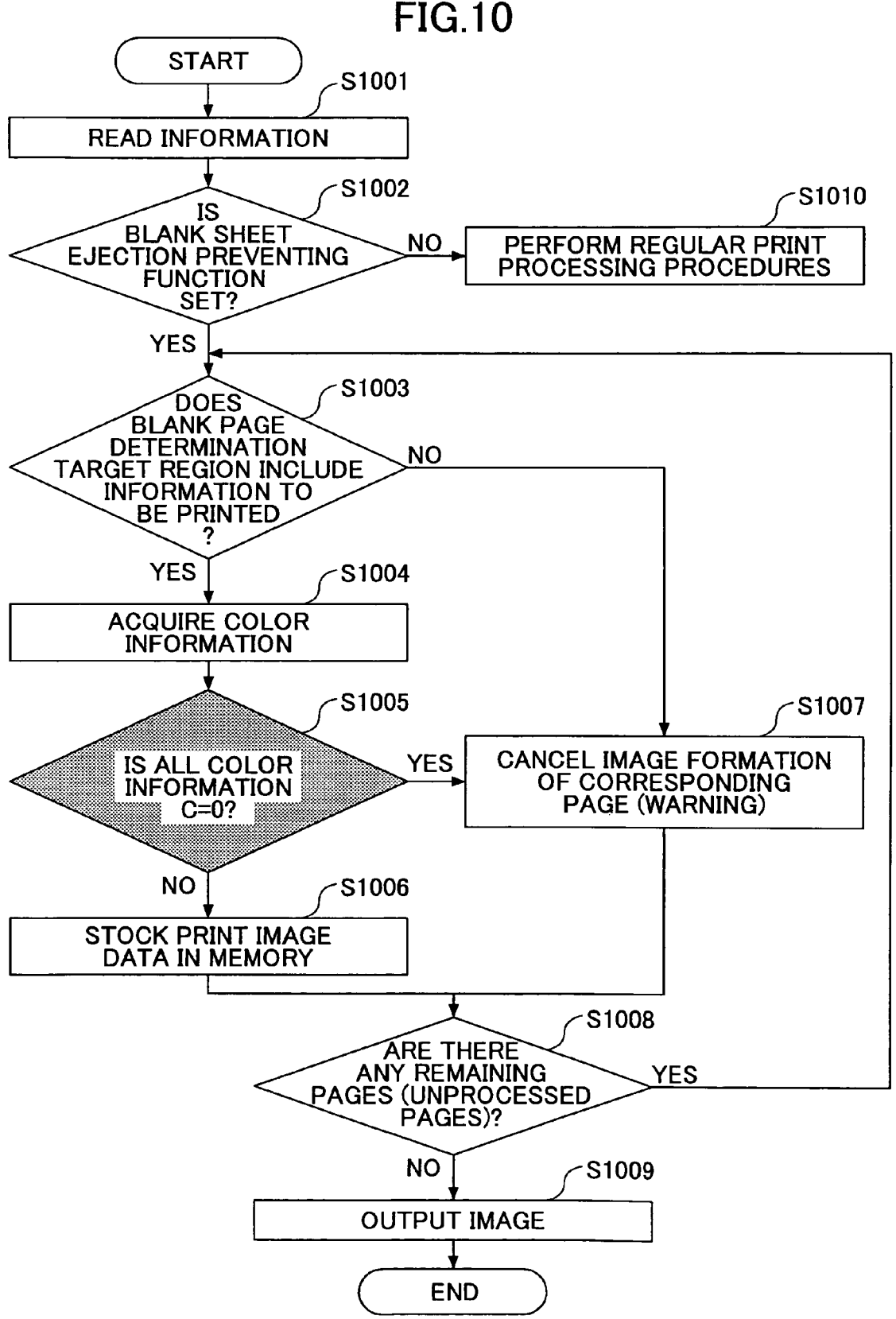
FIG. 10 is a flowchart of a blank page determination process for a page having a color space of a single color.

With reference to a flowchart shown in FIG. 10, a description is given of the blank page determination process for a page having a color space of only one color (e.g., cyan) as described above. The only difference between FIG. 4 and FIG. 10 is step S1005 of FIG. 10, and therefore descriptions of the other steps are not further described.

In step S1005, it is determined whether there is a cyan color in the acquired color information. If the color information is C=0 for all the information to be printed (character information, image information), it means that the page does not include cyan character information or cyan image information. Therefore, the flow proceeds to step S1007, and the image formation for this page is cancelled. Even if the page included character information in a color other than cyan, e.g., black, the color space in this example is cyan, and therefore black character information is not visible and therefore not printed. In this case, the page is determined to be a blank page in the blank page determination process.

Meanwhile, if the color information is C≠0 for the information to be printed (character information, image information), it means that the page includes cyan information. Therefore, the flow proceeds to step S1006 and beyond to perform the printing process.

In the present example, when an electronic file (page) has a color space of a single color, but the electronic file (page) only includes character information or image information in a color that is not included in the color space (color other than the particular single color), a blank sheet can be prevented from being ejected. Thus, print sheets can be prevented from being wasted. The same obviously applies to a case of the RGB format. Furthermore, in the present example, the color space includes a single color. However, the same also applies to a case where the electronic file (page) has a color space including plural colors, but the electronic file (page) only includes character information or image information in a color that is not included in the color space (color other than the particular plural colors).

EXAMPLE 2

Operations for Double-Sided Printing

Figure 11:
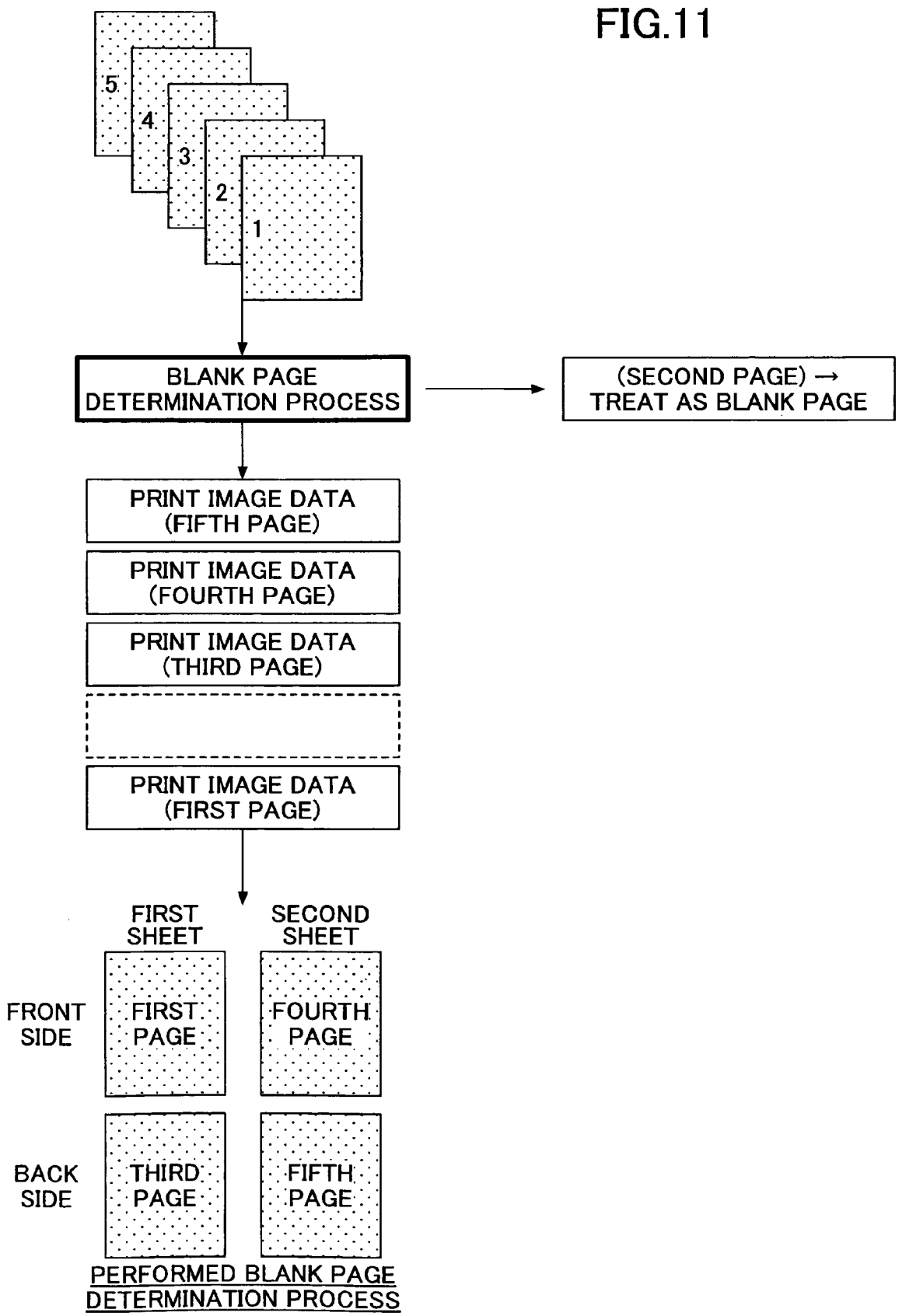
FIG. 11 illustrates sheets printed out as a result of performing the blank page determination process in double-sided printing.
Figure 12:
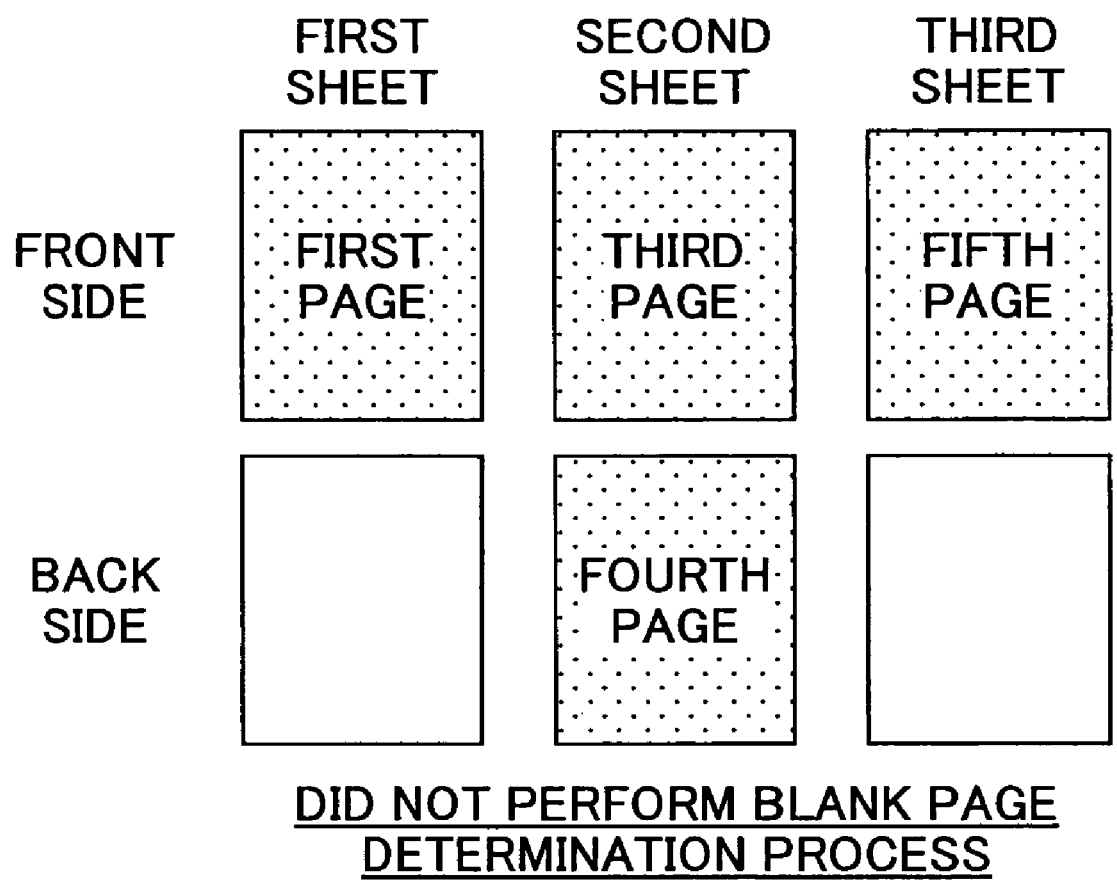
FIG. 12 illustrates sheets printed out as a result of not performing the blank page determination process in double-sided printing.

The image forming apparatus 1 according to an embodiment of the present invention is a so-called MFP, which can perform double-sided printing by printing two pages onto the front side and the back side of a single print sheet. FIG. 11 illustrates the sheets printed out as a result of performing the blank page determination process in double-sided printing. When printing an electronic file including five pages, for example, blank page determination is performed. The second page has been determined as being a blank page. Therefore, the third page, which absent a blank page determination would be printed onto the second sheet, is printed onto the back side of the first sheet. FIG. 12 illustrates sheets that have been printed out when double-side printing is performed but blank page determination is not performed (blank sheet ejection preventing function is turned OFF). In FIG. 12, the second page is a blank page; however, blank page determination is not performed, and therefore a blank page is printed onto the back side of the first sheet. In the examples shown in FIGS. 11 and 12, when blank page determination is performed, one sheet of paper can be saved, compared to the case of not performing blank page determination. As the number of averted printouts and blank pages increase, more sheets can be saved.

The specific process for such a configuration is the same as those described for step S406 in FIG. 4. That is, when a page is determined as not being a blank page and thus needs to be printed, the page is subjected to an image forming process as print image data and is stored in a memory (e.g., print cue). The print image data items that have been stored are then printed by double-sided printing in the order they have been stored.

According to an aspect of the present invention, there is provided an image forming apparatus for printing out one or more pages in an electronic file having color information in the form of at least one of character information and image information, including an information acquiring unit configured to acquire at least one of the character information and the image information from the electronic file; and a blank page determining unit configured to determine whether a page in the electronic file is a blank page based on the color information of at least one of the character information and the image information acquired by the information acquiring unit, wherein a page that is determined as being a blank page by the blank page determining unit is cancelled from being printed out.

Additionally, in the image forming apparatus, the color information is expressed by values of C (cyan), M (magenta), Y (yellow), and K (black).

Additionally, in the image forming apparatus, the blank page determining unit determines that the page is a blank page when all of the values of the color information of the page are C=M=Y=K=0.

Additionally, in the image forming apparatus, when a printing color of the image forming apparatus is set to be a particular color, the blank page determining unit determines that the page is a blank page in the event that all of the values of the color information are not a value expressing the particular color.

Additionally, the image forming apparatus, further includes a double-sided printing unit configured to print the electronic file including one or more of the pages onto both sides of a print medium, wherein in the event that one of the pages is determined as being a blank page, a subsequent one of the pages that is determined as not being a blank page is printed onto a side of the print medium corresponding to the one of the pages determined as being the blank page.

A method, an device, a system, a computer program product, and a recording medium, etc., to which elements or combinations of elements according to an aspect of the present invention are applied, are also valid as embodiments of the present invention.

The present invention is not limited to the specifically disclosed embodiment, and variations and modifications may be made without departing from the scope of the present invention.

The present application is based on Japanese Priority Patent Application No. 2008-015477, filed on Jan. 25, 2008, the entire contents of which are hereby incorporated herein by reference.

What is claimed is:

1. An image forming apparatus for printing out one or more pages in an electronic file having color information in the form of at least one of character information and image information, comprising:
   an information acquiring unit configured to acquire at least one of the character information and the image information from the electronic file;
   a target region determining unit configured to determine whether a target region includes the acquired at least one of the character information and the image information from the electronic file, the target region being a portion of a page to be printed;
   a color information acquiring unit configured to acquire color information of at least one of the character information and the image information, if the target region determines unit determines that the target region includes the acquired at least one of the character information and the image information from the electronic file; and
   a blank page determining unit configured to determine whether a page in the electronic file is a blank page based on the color information acquired by the color information acquiring unit, wherein a page that is determined as being the blank page by the blank page determining unit is cancelled from being printed out,
   wherein if a printing color of the image forming apparatus is set to be a particular color, the blank page determining unit determines that the page is the blank page if all values of the color information are not a value expressing the particular color.

2. The image forming apparatus according to claim 1, wherein the color information is expressed by values of C (cyan), M (magenta), Y (yellow), and K (black).

3. The image forming apparatus according to claim 1, wherein the color information is expressed by values of R (red), G (green), and B (blue).

4. The image forming apparatus according to claim 2, wherein if the printing color of the image forming apparatus is not set to be the particular color, the blank page determining unit determines that the page is the-blank page when all of the values of the color information of the page are C=M=Y=K=0.

5. The image forming apparatus according to claim 3, wherein if the printing color of the image forming apparatus is not set to be the particular color, the blank page determining unit determines that the page is the blank page when all of the values of the color information of the page are R=G=B=255.

6. The image forming apparatus according to claim 4, wherein the blank page determining unit treats blank characters and line feed characters included in the character information as having the values of the color information as C=M=Y=K=0.

7. The image forming apparatus according to claim 5, wherein the blank page determining unit treats blank characters and line feed characters included in the character information as having the values of the color information as R=G=B=255.

8. The image forming apparatus according to claim 1, wherein in the event that the blank page determining unit determines that the page is the blank page, a warning is given to a user of the image forming apparatus instead of cancelling the blank page from being printed out.

9. The image forming apparatus according to claim 1, further comprising:
   a double-sided printing unit configured to print the electronic file comprising one or more of the pages onto both sides of a print medium, wherein
   in the event that one of the pages is determined as being the blank page, a subsequent one of the pages that is determined as not being the blank page is printed onto a side of the print medium corresponding to the one of the pages determined as being the blank page.

10. A blank sheet ejection preventing method performed in an image forming apparatus for printing out one or more pages in an electronic file having color information, the blank sheet ejection preventing method comprising:
    acquiring at least one of character information and image information from the electronic file;
    determining whether a target region includes the acquired at least one of the character information and the image information from the electronic file, the target region being a portion of a page to be printed;
    acquiring color information of at least one of the character information and the image information, if the determining step determines that the target region includes the acquired at least one of the character information and the image information from the electronic file; and
    determining whether a page in the electronic file is a blank page based on the acquired color information of at least one of the character information and the image information, wherein the page that is determined as being the blank page at the blank page determining step is cancelled from being printed out,
    wherein if a printing color of the image forming apparatus is set to be a particular color, the determining step determines that the page is the blank page if all values of the color information are not a value expressing the particular color.

11. The image forming apparatus according to claim 1, wherein if the image forming apparatus is configured to print out the one or more pages having color information in CMYK format, and the acquired at least one of character information and image information includes color information in RGB format, the blank page determining unit determines whether the page is blank using values of the RGB format without converting the electronic file into the CMYK format.

12. The blank sheet ejection preventing method of claim 10, wherein if the image forming apparatus is configured to print out the one or more pages having color information in CMYK format, and the acquired at least one of character information and image information includes color information in RGB format, the determining step determines whether the page is blank using values of the RGB format without converting the electronic file into the CMYK format.

13. The image forming apparatus according to claim 1, wherein the page in the electronic file is cancelled from being printed out, if the blank page determining unit determines that the page is blank based on all values of the color information not expressing the particular color.

14. The image forming apparatus according to claim 1, wherein the blank page determining unit determines whether the page is blank based on a plurality of colors included in the color information.

* * * * *